Figure 1:
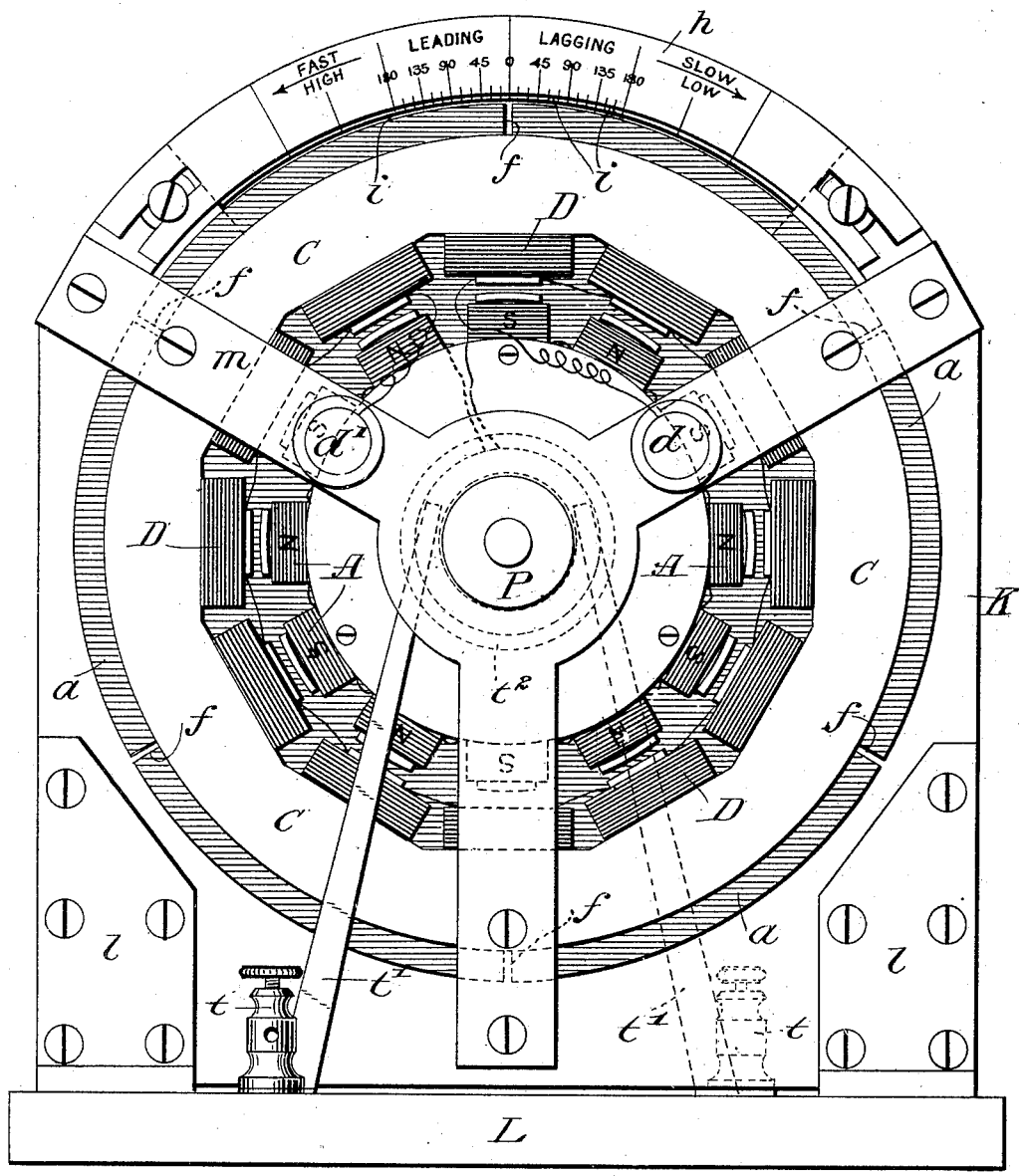

No. 660,561. Patented Oct. 30, 1900.
C. L. CLARKE.
ELECTRIC INDICATOR.
(Application filed July 10, 1900.)

(No Model.) 2 Sheets—Sheet 1.

WITNESSES: INVENTOR
George T. Hackley. Charles L. Clarke.
L. Vreeland. BY
ATTORNEY

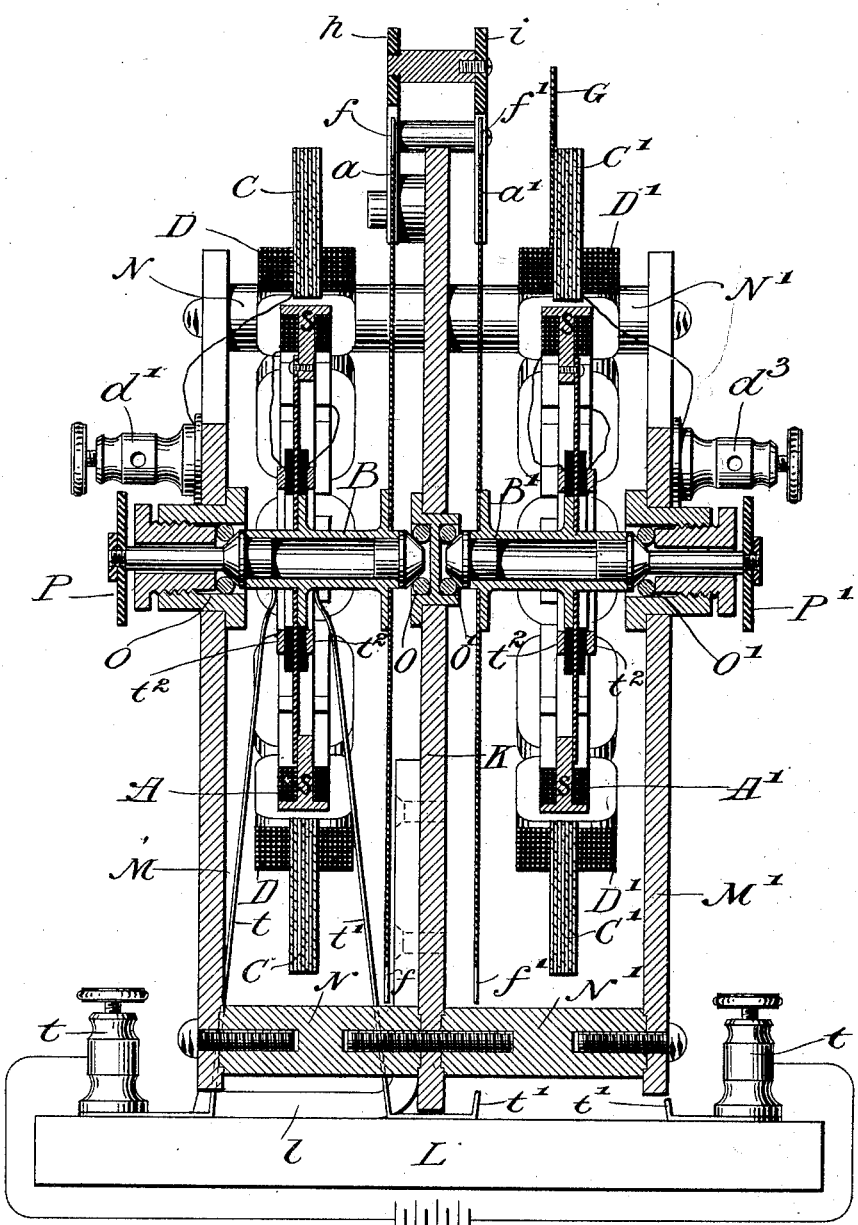

UNITED STATES PATENT OFFICE.

CHARLES L. CLARKE, OF RYE, NEW YORK.

ELECTRIC INDICATOR.

SPECIFICATION forming part of Letters Patent No. 660,561, dated October 30, 1900.

Application filed July 10, 1900. Serial No. 23,100. (No model.)

*To all whom it may concern:*

Be it known that I, CHARLES L. CLARKE, a citizen of the United States, residing at Rye, Westchester county, State of New York, have invented certain new and useful Improvements in Electric Indicators, of which the following is a full, clear, and exact description.

My invention relates to improvements in electric indicators such as described in my former application, Serial No. 1,717, filed January 17, 1900, and has for its object the making of an apparatus for indicating certain phase and frequency relations in alternating-current systems which shall be more compact and convenient in arrangement and construction, more durable under continued operation, and more efficient in its action, and some of my improvements also have in view an apparatus which shall be applicable for use with both single-phase and multiphase systems.

The following is a description of an apparatus embodying my invention, reference being had to the accompanying drawings, in which—

Figure 1 is a front elevation of my improved apparatus, and Fig. 2 is a side-elevation midsectional view thereof.

Referring particularly to the drawings, A B C and A' B' C' represent a pair of similar single-phase alternating-current motors, in this case each motor having six pairs of poles, in which $a$ $a'$ are two stroboscopic disks, (shutter-disk and target-disk, respectively,) mounted on the rotatable shafts B B', which also carry the armatures A A'. These armatures are polarized so as to make alternate north and south poles N S by a continuous current led to the coils N S thereon from the source T by the two binding-posts $t$, four brushes $t'$, and four collecting-rings $t^2$.

C C' are two field-magnets of the respective motors, each of which has its windings D D' connected, respectively, with the binding-posts $d$ $d'$ and $d^2$ $d^3$. The binding-post $d^2$ is not shown in the drawings; but in Fig. 1 said binding-post is to be understood as being located directly behind the binding-post $d$, just as $d^3$ is located behind $d'$, as shown in Fig. 2. The windings on the field-magnets are so disposed as to make the alternate poles of each when energized of opposite polarity, and let it be assumed that when a current flows in by the binding-posts $d$ and $d^2$ and out by the binding-posts $d'$ and $d^3$ the uppermost and lowermost poles and every second pole therefrom are of north polarity and all the intermediate poles are of south polarity. In the rim of each of the disks $a$ $a'$, which are preferably blackened aluminium, are six slots, (as many slots as there are pairs of poles in each motor,) disposed at equiangular distances apart around the rim, those in the former (shutter-disk $a$) being marked $f$ and those in the latter (target-disk $a$) being marked $f'$, and let it be assumed that said disks are so mounted on their shafts that the slots shall be diametrically in line with those poles of the armatures A A' which are of like polarity when the latter are energized by a continuous current, as before described. For example, let the shutter-disk $a$ be mounted on the shaft B, so that the slots $f$ shall be diametrically in line with south poles S of the armature A, as shown in Fig. 1. In such case the target-disk $a'$ is to be so mounted on the shaft B' that the slots $f'$ shall also be diametrically in line with the south poles of the armature A'. Behind these disks is a well-lighted white screen G, which when the slots in the two disks are in line with the eye is visible and makes the slot in the target-disk constitute a plainly-visible white object. Above these disks $a$ $a'$ is placed an angularly-adjustable two-part scale consisting of the front part $h$, substantially in the same plane as the shutter-disk $a$, and the rear part $i$, fixed to $h$ and substantially in the same plane as the target-disk $a'$. The front part of the scale is marked to read to one hundred and eighty degrees on either side of the zero-line, and the total width of the scale, which is three hundred and sixty degrees, embraces the one-twelfth part of the circumference of a circle, (that part of the circumference of a circle which is equal to the whole circumference divided by twice the number of pairs of poles in the motor,) as shown in Fig. 1. The rear part of the scale has markings $i'$ the same distance apart as the corresponding markings on $h$, so that by keeping the eye in line with corresponding markings on both parts of the scale parallactic errors are avoided in reading the indications of the apparatus.

The part $h$ of the scale has also upon it the words "Fast," "High," "Leading," "Slow," "Low," "Lagging," and two arrows, as shown in Fig. 1, the significance of which will hereinafter appear.

The two motors have a common central support K, which is of iron or similar magnetic material and serves not only as a support, but also as a magnetic shield for preventing the alternating field surrounding one motor from exerting any disturbing effect upon the other. This support is mounted on a base L by the brackets $l\ l$ and carries the whole structure, the outside members M M' being secured thereto by posts N N'. The two motors have their shafts mounted in ball-bearings O O', and said shafts extending through one bearing have knurled knobs P P', by which they may be impelled by hand, and in this manner the motors may be brought up to synchronism.

In order to use my apparatus to indicate the phase and frequency relations of the electromotive force of an incoming single-phase dynamo to the electromotive force of the single-phase mains with which similar dynamos in operation are connected, the binding-post $d$ of the motor A B C is connected with one of the mains of the system, the binding-post $d^2$ of the motor A' B' C' is connected with the corresponding lead of the incoming dynamo—to wit, that lead which is later connected with said main by means of the switch for connecting said dynamo with and disconnecting it from said main—and the two other binding-posts $d'$ and $d^3$ of the motors are connected with the remaining main and leads of the incoming dynamo, respectively, the armature-coils of the motors being energized from a source of continuous current. The motor A B C is then rotated clockwise relatively to the scale by means of the knob P, and the motor A' B' C' is rotated counter-clockwise by means of the knob P', and in this manner both motors are brought into synchronous operation with the electromotive forces of the circuits with which they are respectively connected. The stroboscopic images caused by the slots $f\ f'$ and screens G (which images will be nearly white in color and substantially the same in appearance as the white objects formed by the slots in the target-disk as seen against the screen) will under circumstances to be explained then indicate certain frequency relations between the electromotive forces of the incoming dynamo and the system and when said frequencies are alike will indicate what the phase relations of the electromotive forces are. When the total number of images formed is twelve (twice as many images as there are pairs of poles in each motor) and said images are at equiangular distances apart (in which case they will be three hundred and sixty degrees apart measured on the scale and not more than one image will be within the three-hundred-and-sixty-degree limits of the scale at the same time) and are rotating clockwise, the apparatus indicates that the polar speed of the incoming dynamo is a little slower than the polar speed of the dynamos connected with the mains, and consequently that the electromotive force of the incoming dynamo is of somewhat lower frequency than that of the electromotive force of the mains. The less this difference in frequency is the slower will be the rotation of the images, and when the images are stationary the apparatus indicates that the frequencies are alike, and therefore that the incoming dynamo has the same polar speed as or is in synchronism with the other dynamos connected with the mains. Rotation of the said twelve images counter-clockwise indicates that the polar speed of the incoming dynamo is a little faster and the frequency of its electromotive force is somewhat higher as compared with the speed and frequency for the dynamos already in the system. When the dynamos are in synchronism, and therefore the said twelve images are stationary, the position of an image on the right of the zero-line of the scale indicates the degree to which the electromotive force of the incoming dynamo lags behind opposition with the electromotive force of the mains, it being assumed that the scale has been adjusted beforehand by clamping it with its zero-line opposite an image, while both motors of the apparatus are operated by currents derived from the mains by connecting the binding-posts $d\ d^2$ with one main and the binding-posts $d'\ d^3$ with the other main, in which case the electromotive forces of said currents will be of like frequency and in phase. Similarly the position of a stationary image on the left of the zero-line indicates the degree of lead. When an image stands at the zero-point, the incoming dynamo will be running in synchronism and in phase or in step with the system.

It is obvious that by connecting the motor A B C across a line and inserting the motor A' B' C' in the line the apparatus may be employed to indicate the phase relations of the electromotive force and current in said line. It will also be seen that this single-phase electrical indicator can be used to give indications for multiphase apparatus similar to such as have been hereinbefore described for single-phase apparatus, if corresponding conductors of the multiphase apparatus are selected.

Many of the features of my invention are not confined to an indicating apparatus employing single-phase-motor devices, and I do not wish to be understood as implying that they are not capable of embodiment in such other apparatus.

What I claim is—

1. In an electrical indicating apparatus the combination of two alternating-current motors and a magnetic shield located between them, substantially as described.

2. In an electrical indicating apparatus the combination of two alternating-current motors, a stroboscopic system having each of its elements independently operated by one of said motors and a magnetic shield located between said motors, substantially as described.

3. In an electrical indicating apparatus two alternating-current motors, having energizing-coils upon their armatures connected to a source of continuous-current supply, and a stroboscopic system having each of its elements independently operated by one of said motors, substantially as described.

4. In an electrical indicating apparatus the combination of two alternating-current electric motors, two elements of a stroboscopic system each operated by one of said motors, and a screen behind said elements.

5. In an electrical indicating apparatus the combination of two alternating-current electric motors, stroboscopic disks operated independently thereby having slots in their peripheries and a screen behind said slots, substantially as described.

6. In an electrical indicating apparatus the combination of a stroboscopic system and means for independently operating the elements thereof by alternating currents and a scale located near the stroboscopic images, substantially as described.

7. In an electrical indicating apparatus the combination of a stroboscopic system two alternating-current motors for independently operating the elements thereof and a scale located near the stroboscopic image provided with means for avoiding parallactic error.

CHARLES L. CLARKE.

Witnesses:
L. VREELAND,
GEORGE T. HACKLEY.